US010000855B2

(12) United States Patent
Beverage et al.

(10) Patent No.: US 10,000,855 B2
(45) Date of Patent: Jun. 19, 2018

(54) MULTI-STACK ELECTROCHEMICAL COMPRESSOR SYSTEM AND METHOD FOR OPERATING

(71) Applicant: Nuvera Fuel Cells, Inc., Billerica, MA (US)

(72) Inventors: Kevin Beverage, Leominster, MA (US); Scott Blanchet, Chelmsford, MA (US)

(73) Assignee: Nuvera Fuel Cells, LLC, Billerica, MA (US)

( * ) Notice: Subject to any disclaimer, the term of this patent is extended or adjusted under 35 U.S.C. 154(b) by 365 days.

(21) Appl. No.: 14/790,045

(22) Filed: Jul. 2, 2015

(65) Prior Publication Data

US 2016/0002795 A1    Jan. 7, 2016

Related U.S. Application Data

(60) Provisional application No. 62/020,030, filed on Jul. 2, 2014.

(51) Int. Cl.
| | |
|---|---|
| *C25B 1/12* | (2006.01) |
| *C25B 9/08* | (2006.01) |
| *C25B 15/02* | (2006.01) |
| *C25B 9/00* | (2006.01) |
| *B01D 53/32* | (2006.01) |
| *C25B 1/10* | (2006.01) |
| *C25B 9/20* | (2006.01) |

(52) U.S. Cl.
CPC .............. *C25B 1/12* (2013.01); *B01D 53/326* (2013.01); *C25B 1/10* (2013.01); *C25B 9/00* (2013.01); *C25B 9/08* (2013.01); *C25B 9/206* (2013.01); *C25B 15/02* (2013.01); *Y02E 60/366* (2013.01)

(58) Field of Classification Search
CPC .................................................. B01D 53/326
See application file for complete search history.

(56) References Cited

U.S. PATENT DOCUMENTS

| | | |
|---|---|---|
| 2005/0121315 A1 | 6/2005 | Baltrucki et al. |
| 2009/0136790 A1 | 5/2009 | Schrieber et al. |
| 2011/0042228 A1* | 2/2011 | Hinatsu .................... C25B 1/10 205/344 |
| 2013/0317959 A1 | 11/2013 | Joos et al. |
| 2014/0027273 A1 | 1/2014 | Naugler et al. |

FOREIGN PATENT DOCUMENTS

EP    2 674 515 A1    12/2013

OTHER PUBLICATIONS

PCT International Search Report and the Written Opinion of the International Searching Authority issued in International Patent Application No. PCT/US2015/038956, dated Sep. 21, 2015.

* cited by examiner

*Primary Examiner* — Nicholas A Smith
(74) *Attorney, Agent, or Firm* — Finnegan, Henderson, Farabow, Garrett & Dunner LLP (57) ABSTRACT

A multi-stack electrochemical hydrogen compressor (EHC) system is provided. The EHC system may have two or more EHC stacks, wherein each EHC stack includes at least one electrochemical cell and a power supply. The EHC system may also have a controller in communication with the power supply of each EHC stack, wherein the controller is configured to reduce total energy consumption of the EHC system by independently controlling the power supply of each EHC stack.

15 Claims, 5 Drawing Sheets

MULTI-STACK ELECTROCHEMICAL COMPRESSOR SYSTEM AND METHOD FOR OPERATING

This application claims the benefit of U.S. Provisional Application No. 62/020,030, filed Jul. 2, 2014, which is incorporated by reference in its entirety.

The present disclosure is directed towards a multi-stack electrochemical compressor (EHC) system and method for operating, and more particularly, a multi-stack EHC system and method for optimizing electrical power consumption.

Hydrogen has emerged as a viable alternative to traditional power sources. Successful commercialization of hydrogen as an energy carrier and the long-term sustainability of a "hydrogen economy" depends largely on the efficiency and cost-effectiveness of hydrogen fuel cells, hydrogen electrolysis cells, hydrogen generation, hydrogen manipulation/management systems (e.g., compressors), and hydrogen distribution systems. Gaseous hydrogen is a convenient and efficient means of energy storage, usually by pressurized containment. Advantageously, storing hydrogen at high pressure yields high energy density.

Electrochemical hydrogen compressors (EHC) are quiet, scalable, modular, and efficient mechanisms for pressurizing hydrogen. An EHC can be formed of a membrane electrode assembly (MEA). The MEA can comprise a negatively charged anode, a positively charged cathode, and a proton exchange membrane separating the anode and cathode. A current can be passed through the MEA while a gas containing hydrogen can contact the negatively charged anode, at the anode the hydrogen molecules can be oxidized and the reaction can produce two electrons and two protons. The two protons can be electrochemically driven through the membrane to the positively charged cathode, where they can be rejoined by two rerouted electrons and reduced to form a hydrogen molecule. EHCs operating in this manner are sometimes referred to as a hydrogen pumps. When the hydrogen accumulated at the positively charged cathode is restricted to a confined space, the EHC pressurizes the hydrogen. An EHC may also be referred to as an EHC stack.

EHC stacks can be arranged in series to form multi-stage EHC stacks enabling compression of hydrogen to higher pressures. EHC stacks can also be arranged in parallel to form multi-stack EHC systems enabling increased volume capacity. Traditionally a multi-stack EHC system may include two or more EHC stacks. For a multi-stack EHC system a power supply delivers power to all the EHC stacks and the total current to the system is controlled to maintain throughput of hydrogen. This relationship is represented by equation 1 shown below.

$$H_2 \sim I_{tot} \quad \text{Equation (1)}$$

Therefore, the multi-stack EHC system acts as a single large stack on a single load that demands the same current for all stacks. This relationship can be represented by equations 2 for current and equation 3 for power shown below.

$$I_{tot} = \sum_1^n I_n \quad \text{Equation (2)}$$

$$P_{tot} = \sum_n^1 I_n^2 \cdot R_n \quad \text{Equation (3)}$$

One of the disadvantages to this method of operation is that a poor stack (e.g., malfunctioning or deteriorated) is then forced to operate beyond its safe range, quickly accelerating degradation and at the same time energy efficiency also suffers. One method to reduce the likelihood of degradation and allow for operation within safe limits of the poor stack is total system derating. For example, in the event of a poor performing cell or stack, total system current and power may be reduced to prevent the poor cell or stack failure. Although this method may reduce the likelihood of the poor cell or stack failure, it is less than optimal because the energy efficiency still suffers and reducing the total system current and power reduces the system throughput.

In consideration of the aforementioned circumstances, the present disclosure provides an improved system and method for operating a multi-stack EHC system.

In one aspect, the present disclosure is directed to a multi-stack electrochemical hydrogen compressor (EHC) system. The EHC system may include two or more EHC stacks, wherein each EHC stack includes at least one electrochemical cell and a power supply. The EHC system may also include a controller in communication with the power supply of each EHC stack, wherein the controller is configured to reduce total energy consumption of the EHC system by independently controlling the power supply of each EHC stack.

In another aspect, the present disclosure is directed to a method of controlling a multi-stack electrochemical hydrogen compressor (EHC) system having two or more EHC stacks. The method may include directing a gas stream containing hydrogen to the two or more EHC stacks. The method may also include supplying power to the two or more EHC stacks from independent power supplies and controlling the power independently supplied to each EHC stack.

Additional objects and advantages of the present disclosure will be set forth in part in the description which follows, and in part will be obvious from the description, or may be learned by practice of the present disclosure. The objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure as claimed.

The accompanying drawings, which are incorporated in and constitute a part of this specification, illustrate several embodiments of the present disclosure and together with the description, serve to explain the principles of the present disclosure.

Reference will now be made in detail to the present exemplary embodiments of the present disclosure, and examples of which are illustrated in the accompanying drawings. Wherever possible, the same reference numbers will be used throughout the drawings to refer to the same or like parts.

The present disclosure is described herein with reference to illustrative embodiments for a particular application, such as, pressurizing hydrogen. It is understood that the embodiments described herein are not limited thereto. Those having ordinary skill in the art and access to the teachings provided herein will recognize additional modifications, applications, embodiments, and substitution of equivalents that all fall with the scope of the present disclosure. Accordingly, the present disclosure is not limited by the foregoing or following descriptions.

Figure 1:
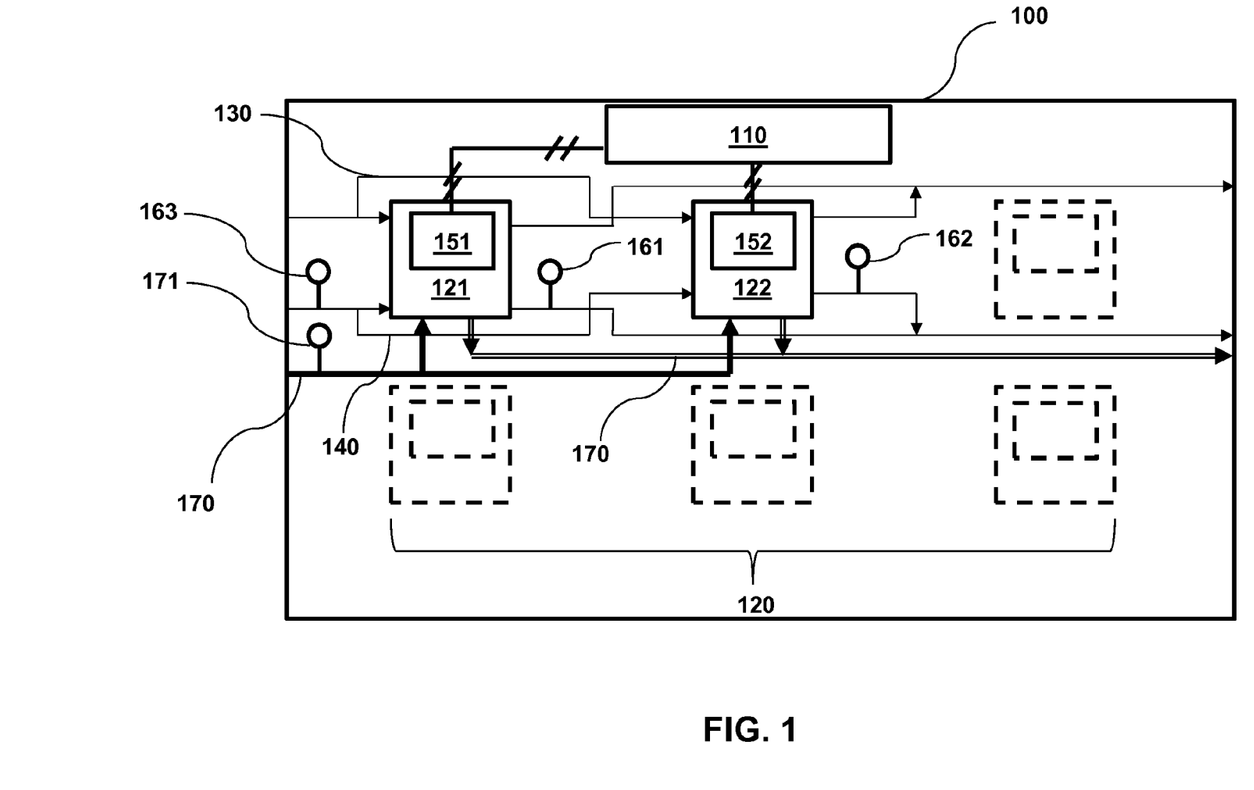
FIG. 1 illustrates a multi-stack electrochemical hydrogen compressor (EHC) system, according to an exemplary embodiment.

FIG. 1 is a schematic illustration of a multi-stack electrochemical hydrogen compressor (EHC) system 100, according to an exemplary embodiment. EHC system 100 can include one or more EHC stacks 120. For example, EHC system 100 as shown in FIG. includes two EHC stacks (i.e., EHC stack 121 and EHC stack 122). In other embodiments, EHC system 100 may include more than two EHC stacks. For example, EHC system 100 may include 3, 4, 5, 6, 7, 8, 9, 10, 15, 20, 25 or more EHC stacks. Each EHC stack (e.g., 121 and 122) can include one or more electrochemical cells. Each EHC stack could include just a single electrochemical cell or a plurality of electrochemical cells ranging from, for example, 2 to 500 or more. The number of electrochemical cells forming each EHC stack within EHC system 100 can be the same for all the EHC stacks or can vary between the stacks. For example, EHC stack 121 could have 250 electrochemical cells while EHC stack 122 could have 300 electrochemical cells.

Each EHC stack (e.g., 121 and 122) can be in electrical communication with a power supply. For example, EHC stack 121 can be in electrical communication with a power supply 151 while EHC stack 122 can be in electrical communication with a power supply 152, as shown in FIG. 1. Each power supply 151/152 may be configured to supply power (P) to its corresponding EHC stack 121/122. Each power supply 151/152 may be configured to control the power supplied by adjusting either the current (I) or electrical potential (i.e., voltage (V)). In some embodiment, a single power supply may be configured to supply power to a plurality of EHC stacks (e.g., 121 and 122) and may be configured to independently control the power supplied to each EHC stack.

Current (I) supplied by each power supply 151/152 may vary, for example, based on the active area of the stack, the number of cells, and process conditions. According to some embodiments, the current may vary between about 0 to 400 amps, 0 to 600 amps, 0 to 800 amps, 0 to 1000 amps, or 0 to greater than 1000 amps. Voltage (V) supplied by each power supply 151/152 may also vary, for example, based on the active area of the stack, the number of cells, and the process conditions. According to some embodiments, the voltage may vary between about 15 to 75 volts, 15 to 100 volts, 15 to 200 volts, 15 to 300 volts, 15 to 500 volts, 15 to 1000 volts, or 15 to greater than 1000 volts.

As is known to one of ordinary skill in the art the relationship between power, voltage, and current may be expressed as the equation shown below.

$$P=IV \qquad \text{Equation (4)}$$

Accordingly, varying current and/or voltage may also cause power (P) to vary. Power (P) supplied by each power supply 151/152 and consumed by each EHC stack may also vary, for example, based on the active area of the stack, the number of cells, and the process conditions. According to some embodiments, the power may vary between about 3500 to 6000 watts, 0 to 7500 watts, 0 to 10000 watts, 0 to 25000 watts, 0 to 50000 watts, or 0 to greater than 50000 watts.

As is known to one of ordinary skill in the art the relationship between power (P) and current (I) may be expressed in terms of resistance (R) as the equation shown below.

$$P=I^2R \qquad \text{Equation (5)}$$

The resistance of each EHC stack 121/122 may vary, for example, based on the active area and number of cells in the stack. The resistivity of each individual cell in the stack may also vary. According to some embodiments, a single cell may have a resistivity of about 10 to 200 mOhm*cm$^2$.

EHC system 100 may also include a controller 110. Controller 110 may be configured to communication with each power supply 151/152. Controller 110 may be configured to control the power (P) output by each power supply 151/152 by varying the current (I) and/or the (V) as described above. Controller 110 may be configured such that the power output by each power supply 151/152 as controlled by controller 110 is substantially the same or is unique to each EHC stack 121/122.

EHC system 100 may also include a hydrogen distribution circuit 170 configured to direct a gas containing hydrogen to each EHC stack and then collect the pressurized hydrogen from each EHC stack and direct it out of EHC system 100. Hydrogen distribution circuit 170 may include a plurality of passages or conduits configured to carry the gas containing hydrogen and the pressurized hydrogen. EHC system 100 may also include a flow meter 171 disposed in a passage of the hydrogen distribution circuit at the inlet of EHC system 100. Flow meter 171 may be configured to generate a signal indicative of the total flow rate of gas containing hydrogen being directed to EHC system 100. Flow meter 171 may be configured to transmit the signal to controller 110.

EHC system 100 may also include a water distribution circuit 130 and a coolant distribution circuit 140. Water distribution circuit 130 can include a plurality of passages or conduits configured to distribute a water stream (e.g., liquid and/or vapor) to each EHC stack and then collect the water stream discharged from each EHC stack and direct the water stream out of the EHC system 100 or the collected water stream can be recycled. Water stream may be used within each stack, for example, to control the humidity within each electrochemical cell and maintain the conductivity of the electrolyte.

Coolant distribution circuit 140 can include a plurality of passages or conduits configured to circulate coolant through each EHC stack. Coolant circulating through each EHC stack can be configured to regulate the temperature of each stack by carrying heat from the stack.

EHC system 100 may also include a first sensor 161, a second sensor 162, and a third sensor 163. First sensor 161 may be configured to generate a signal indicative of the temperature of the coolant exiting EHC stack 121. Second sensor 162 may be configured to generate a signal indicative of the temperature of the coolant exiting EHC stack 122. Third sensor 163 may be configured to generate a signal indicative of the temperature of the coolant entering EHC stacks 121 and 122. Controller 110 may be in communication with first sensor 161, second sensor 162, and third sensor 163. Controller 110 may be configured to receive each signal and based on the signal calculate a temperature change of the coolant within EHC stack 121 and EHC stack 122. Based on the temperature change of the coolant within each stack controller 110 may calculate the coolant flow distribution within each stack utilizing the temperature change and the power of each stack. For example, given the physics of the EHC stack, the electrochemical potential due to pressure differential can be calculated using the Nernst equation shown below.

$$E = E_0 - \frac{RT}{zF} \cdot \ln\left(\frac{p_{red}}{p_{ox}}\right) \quad \text{Equation (6)}$$

The hydrogen pressure at the anode and cathode are the source of the concentration differential. This Nernst potential is reversible and does not contribute to heat generation in the stack. By subtracting the reversible electrochemical potential from the total applied electrical potential from the power supply, the total amount of heat (Q) that needs to be removed from the stack can be estimated. With knowledge of the heat capacity of the coolant and the temperature rise through the stack from 163 to 161 or 162, the flowrate of coolant can be calculated using equation (7) shown below.

$$\dot{m} = \frac{Q}{c_p \cdot \Delta T} \quad \text{Equation (7)}$$

Calculating the coolant flow distribution based on temperature change can simplify EHC system 100 by allowing for the removal of individual flow meters associated with each stack.

Figure 2:
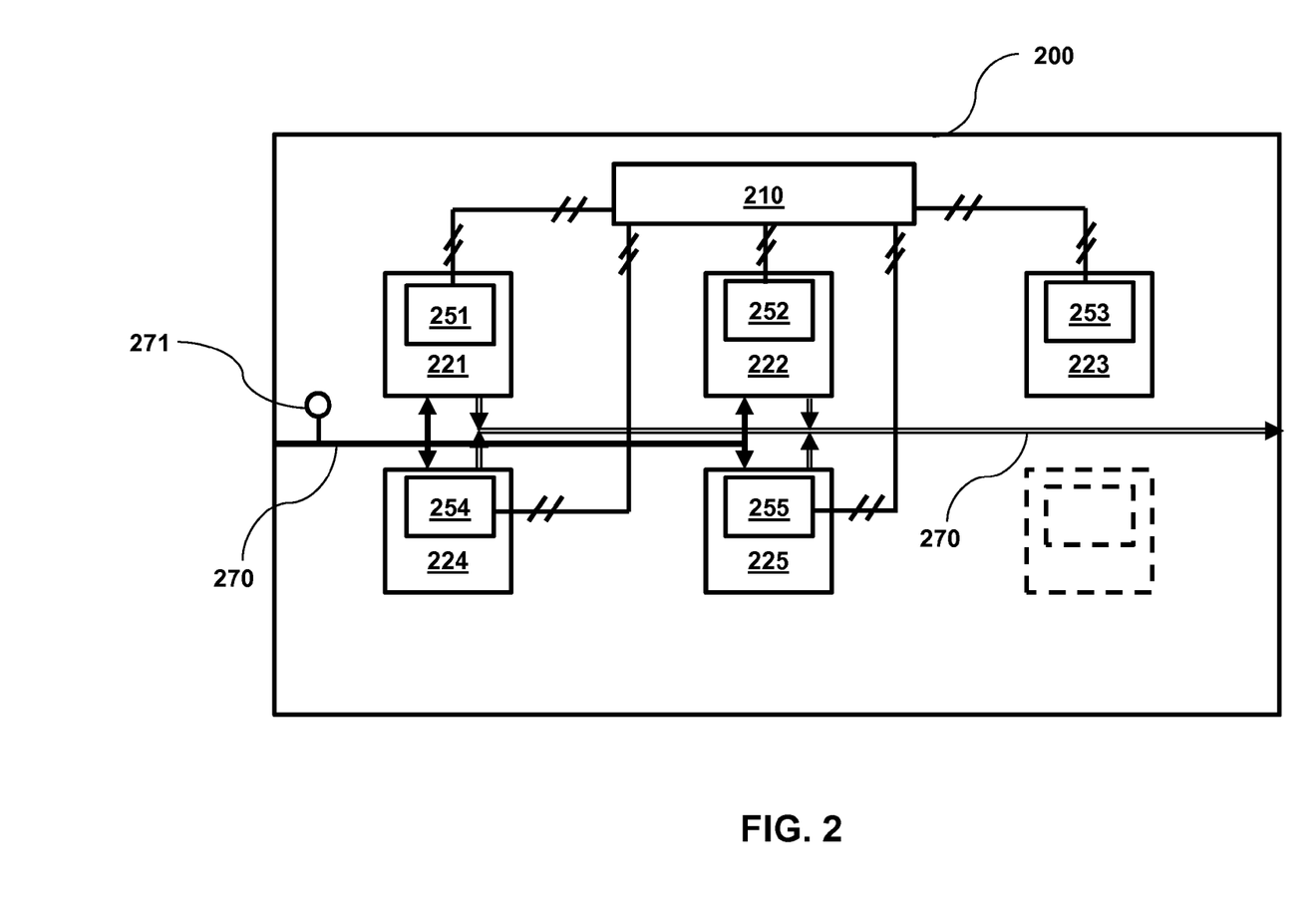
FIG. 2 illustrates a multi-stack EHC system, according to an exemplary embodiment.

FIG. 2 illustrates a schematic illustration of a multi-stack EHC system 200, which is similar to EHC system 100, however EHC system 200 includes five EHC stacks. As shown in FIG. 2, EHC system 200 includes EHC stack 221, 222, 223, 224, and 225. Each EHC stack may be in electrical communication with a power supply (i.e., 251, 252, 253, 254, and 255). In some embodiments, each EHC stack may be in electrical communication with a single power supply configured to independently control the power supplied to each EHC stack. In other words, where independent power supplies are described herein, in some embodiments these could be replaced with a single power module capable of supplying independently controlled power to multiple loads.

EHC system 200 may also include a controller 210 in communication with each power supply. EHC system may also include a hydrogen distribution circuit 270. In the interest of keeping the features of FIG. 2 easily identifiable the water and coolant distribution circuits have not been shown. However, EHC 200 may include both water and coolant distribution circuits same as EHC 100, but expanded to incorporate the additional EHC stacks (e.g., 253, 254, and 255).

EHC system 200 as shown in FIG. 2 was used for three separate numerical analysis trials (i.e., Trial 1, Trial 2, and Trial 2). Each EHC stack within EHC system 200 used for the three trials consisted of 256 electrochemical cells and each cell had an area of about 250 cm². For each trial it was assumed equivalent operating pressures for all the stacks (i.e., equal Nernst potentials).

Trial 1

Trial 1 consisted of operating EHC system 200 according to a traditional power scheme where a total current of 1250 amps is supplied and equal current is supplied to each EHC stack. This scenario illustrates the performance as would be the cause if only a single power supply for the entire system was used to supply each stack. For Trial 1, the current supplied to each stack (i.e., 221, 222, 223, 224, and 225) was 250 Amps from each corresponding power supply (i.e., 251, 252, 253, 254, and 255). Table 1 below shows the parameters and results for each stack for Trial 1.

TABLE 1

| Stack | Power (P) (W) | Resistance (mOhm*cm²) | Area (cm²) | Cells # | Resistance ® (Ohm) | Current (I) (amps) | Voltage (V) (volts) |
|---|---|---|---|---|---|---|---|
| 251 | 5760 | 90 | 250 | 256 | 0.092160 | 250 | 23.04 |
| 252 | 4608 | 72 | 250 | 256 | 0.073728 | 250 | 18.432 |
| 253 | 4608 | 72 | 250 | 256 | 0.073728 | 250 | 18.432 |
| 254 | 4992 | 78 | 250 | 256 | 0.079872 | 250 | 19.968 |
| 255 | 3840 | 60 | 250 | 256 | 0.061440 | 250 | 15.36 |
| $P_{Total}$ | 23808 | | | | $I_{Total}$ | 1250 | |

As shown in Table 1, stack 251 has the highest resistance at 0.092160 Ohms while stack 255 has the lowest resistance at 0.061440 Ohm. As a result of the higher resistance, stack 251 being supplied a current of 250 amps resulted in a power consumption of 5760 watts versus stack 255 being supplied a current of 250 amps resulted in a power consumption of 3840 watts. Corresponding to the highest power consumption, stack 251 also received the highest electrical potential at 23.04 volts.

EHC stack 251 may be characterized as the worst performing stack because of the high resistance and energy consumption. The high resistance and energy consumption could be caused by a variety of issues, for example, one or more faulty cells with the stack, high electrolyte conductivity within one or more cells, low humidity, ion contamination of the electrolyte, catalyst poisoning, poor electrical contact between internal stack components, improper gas distribution, thermal inequalities, etc. EHC stack 255 may be characterized as the best performing stack because of the low resistance and energy consumption. EHC stack 251 exhibited a 50% greater resistivity then EHC stack 255, which equated to 1920 watts more power consumption. At least a portion of the power consumed by each stack is converted to heat. Therefore, the additional power consumed by EHC stack 251 caused EHC stack 151 to operate at a temperature higher than all the stacks.

Trial 2

As described herein, Trial 1 demonstrates the traditional power scheme where each EHC stack is supplied the same amount of current (e.g., 250 amps). In trial 2, rather than supplying each stack the same amount of current, each stack was supplied the same electric potential or voltage (i.e., 18.72 volts) by each corresponding power supply. Table 2 below shows the parameters and results for each stack of Trial 2.

$$min(P_{tot})|I_{tot}~H_2 \quad \text{Equation (8)}$$

$$V_1=V_2=V_3=\ldots V_n|I_{tot}~H_2 \quad \text{Equation (9)}$$

TABLE 2

| Stack | Power (P) (W) | Resistance (mOhm*cm$^2$) | Area (cm$^2$) | Cells # | Resistance (R) (Ohm) | Current (I) (amps) | Voltage (V) (volts) |
|---|---|---|---|---|---|---|---|
| 251 | 3803 | 90 | 250 | 256 | 0.092160 | 203.12 | 18.72 |
| 252 | 4753 | 72 | 250 | 256 | 0.073728 | 253.91 | 18.72 |
| 253 | 4753 | 72 | 250 | 256 | 0.073728 | 253.91 | 18.72 |
| 254 | 4387 | 78 | 250 | 256 | 0.079872 | 234.37 | 18.72 |
| 255 | 5704 | 60 | 250 | 256 | 0.061440 | 304.69 | 18.72 |
| P$_{Total}$ | 23400 | | | | | I$_{Total}$ | 1250 |
| Δ P(W) | 408 | 1.71% | Savings | | | | |
| kWh/day | 9.792 | | | | | | |
| kWh/kg | 0.039168 | | | | | | |

As shown in Table 2, the resistance of each stack is unchanged from Trial 1. In trial 2, the electric potential (i.e., voltage) supplied to each stack was matched across each EHC stack while the individual current to each stack varied between the EHC stacks. Although the individual current to each stack varied for Trial 2, the total current was controlled to remain the same as trial 1 (i.e., 1250 amps).

Matching the voltage of each stack rather than the current can allow the total power consumed to be reduced when compared to the total power consumed for Trial 1. The reduction in total power can be attributed to the increased utilization of the best performing stack (e.g., 255) and the decreased utilization of the worst performing stack (e.g., 251). Such distribution can be achieved because of the individual power supplies associated with each EHC stack.

The increased utilization of EHC stack 255 and decreased utilization of EHC stack 251 was a result of the current differential applied to the EHC stacks. As shown in Table 2, 203.12 amps were applied to EHC stack 251 while 304.69 amps were applied to EHC stack 255. As a result, for Trial 2 EHC stack 251 consumed the least power (i.e., 3803 watts) while EHC stack 255 now consumed the most power (i.e., 5704. Therefore, the best performing stack (e.g., 255) is now the stack running at the highest temperature, in contrast to Trial 1 where the worst performing stack (e.g., 251) was running at the highest temperature.

For Trial 2, the total power consumed was 23400 watts which is 408 watts less than the power consumed for Trial 1. Thus, matching the electrical potential (e.g., 18.72 volts) of the EHC stacks while keeping the total current the same (e.g., 1250 amps), the power consumed was reduced by about 1.71%. The relationship of this power scheme may be represented by equation 8 and 9 shown below.

Trial 3

In trial 3, rather than matching the electrical potential, the total current was kept at 1250 amps while the voltage was varied so that the consumed power (P) of each EHC stack was matched. This relationship may be represented by equation 10 shown below.

$$P_1=P_2=P_3=P_n|I_{tot}~H_2 \quad \text{Equation (10)}$$

Table 2 below shows the parameters and results for each stack during Trial 3.

TABLE 3

| Stack | Power (P) (W) | Resistance (mOhm*cm$^2$) | Area (cm$^2$) | Cells # | Resistance (R) (Ohm) | Current (I) (Amps) | Voltage (V) (Volts) |
|---|---|---|---|---|---|---|---|
| 251 | 4700.34 | 90 | 250 | 256 | 0.092160 | 225.84 | 20.81 |
| 252 | 4700.34 | 72 | 250 | 256 | 0.073728 | 252.49 | 18.62 |
| 253 | 4700.34 | 72 | 250 | 256 | 0.073728 | 252.49 | 18.62 |
| 254 | 4700.34 | 78 | 250 | 256 | 0.079872 | 242.59 | 19.38 |
| 255 | 4700.34 | 60 | 250 | 256 | 0.061440 | 276.59 | 16.99 |
| P$_{Total}$ | 23501.72 | | | | | I$_{Total}$ | 1250 |
| Δ P(W) | 306.28 | 1.29% | Savings | | | | |
| kWh/day | 7.3508 | | | | | | |
| kWh/kg | 0.029403 | | | | | | |

As shown in Table 3, the resistance of each stack is unchanged from Trial 1 and 2. The resulting consumed power value for each EHC stack was about 4,700.34 watts making the total power 23,501.72 watts, which is a savings of 1.29% over that of Trial 1. Although the savings of Trial 3 is less than Trial 2, matching the consumed power of each EHC stack sustains an equivalent heat load, and thereby may attribute to an improved total system durability and longevity.

Figure 3:
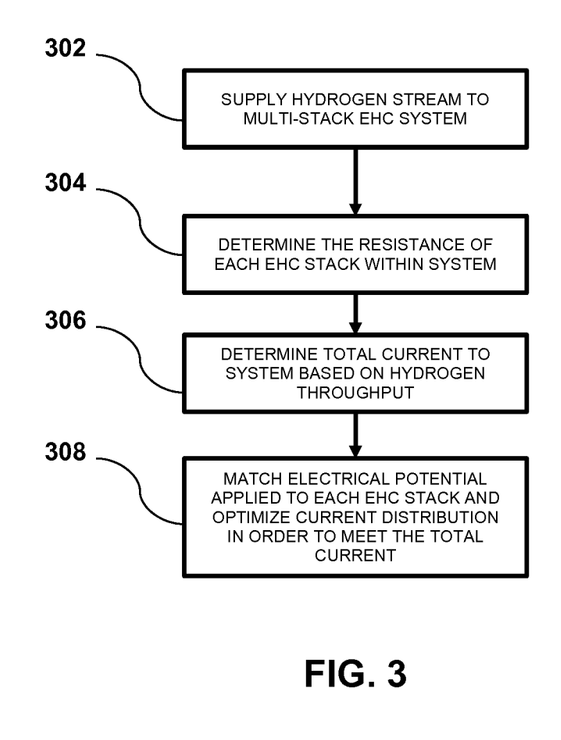
FIG. 3 is a flow chart illustrating an exemplary disclosed method of operating a multi-stack EHC system.

FIG. 3 illustrates an exemplary process performed by a multi-stack EHC system. The processes described herein may correspond to EHC system 100 and/or EHC system 200, as well as other embodiments. EHC system 100/200 as described herein may be configured such that a gas stream containing hydrogen may be directed to the two or more EHC stacks at step 302. Controller 110/210 may be configured such that power may be applied to each EHC stack enabling the determination of the resistance of each EHC stack within EHC system 100/200, at step 304.

At step 306, controller 110/210 may determine the total current (I) to be supplied to EHC system 100 based on the desired hydrogen throughput. Controller 110/210 may receive the desired hydrogen throughput, for example, from flow sensor 171/271 or may be a programmed input of the user. The total current may vary based on the pressure and flow rate of the gas stream containing hydrogen supplied to EHC system 100. At step 308, controller 110/210 may operate as described in Trial 2 by matching the electrical potential applied to each EHC and optimizing the current distribution among the EHC stacks while achieving the total current value.

Figure 4:
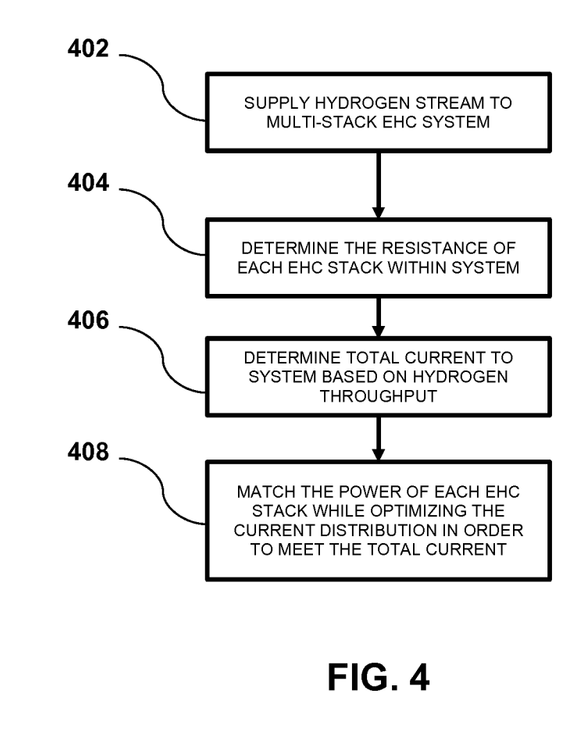
FIG. 4 is a flow chart illustrating an exemplary disclosed method of operating a multi-stack EHC system.

FIG. 4 illustrates an exemplary process performed by multi-stack EHC system 100 similar to the process illustrated in FIG. 3. Steps 402, 404, and 406 shown in FIG. 4 can be the same as steps 302, 304, and 306 shown in FIG. 3. Step 408 shown in FIG. 4 can be different than step 308. At step 408, controller 110/210 may operate as described in Trial 3 by matching the power of each EHC stack while optimizing the current distribution among the EHC stacks while achieving the total current value.

Figure 5:
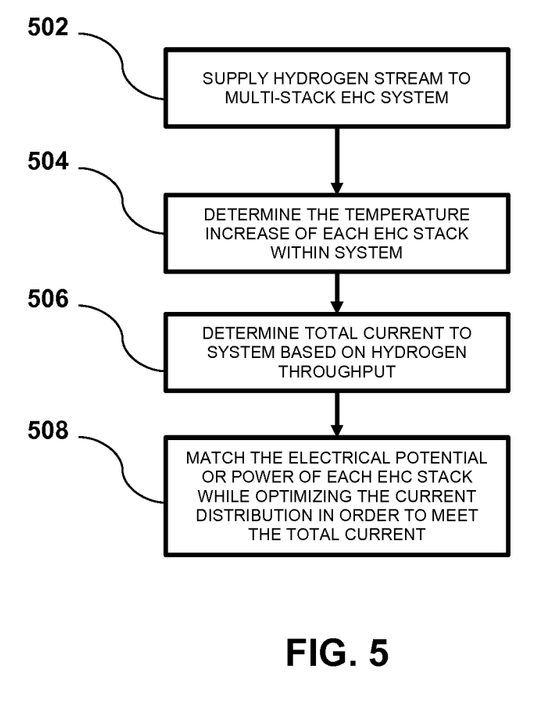
FIG. 5 is a flow chart illustrating an exemplary disclosed method of operating a multi-stack EHC system.

FIG. 5 illustrates an exemplary process performed by multi-stack EHC system 100 similar to the process illustrated in FIG. 4. Steps 502 and 506 shown in FIG. 5 can be the same as steps 402 and 406 shown in FIG. 4. Steps 504 and 508 shown in FIG. 5 can be different than steps 404 and 408. Controller 110/210 may be configured such that power may be applied to each EHC stack enabling the determination of a temperature rise (e.g., difference) across each EHC stack within EHC system 100/200, at step 504. For example, temperature rise may be calculated based on rise in water temperature or coolant temperature through the EHC or just rise in the physical structure of the EHC stack. At step 508, controller 110/210 may operate as described in either Trial 2 or Trial 3 by matching either the electrical potential or the power of each EHC stack while optimizing the current distribution among the EHC stacks while achieving the total current value. The temperature rise of each cell may be utilized by controller 110/210 in setting the power distribution to each cell.

It will be apparent to those skilled in the art that various modifications and variations can be made to the disclosed system and method. Other embodiments will be apparent to those skilled in the art from consideration of the specification and practice of the disclosed system and method. It is intended that the specification and examples be considered as exemplary only, with a true scope being indicated by the following claims and their equivalents.

What is claimed is:

1. A multi-stack electrochemical hydrogen compressor (EHC) system, comprising:
    two or more EHC stacks, wherein each EHC stack comprises;
    at least one electrochemical cell; and
    a power supply;
    a controller in communication with the power supply of each EHC stack;
    wherein the controller is configured to reduce total energy consumption of the EHC system by independently controlling the power supply of each EHC stack;
    a water distribution circuit configured to circulate water through each EHC stack;
    a coolant distribution circuit configured to circulate coolant through each EHC stack; and
    at least one sensor is disposed in the coolant distribution circuit at the outlet of each stack and is configured to generate a signal indicative of the coolant temperature at the outlet of the stack;
    at least one sensor disposed in the coolant distribution circuit, configured to generate a signal indicative of the coolant temperature at the inlet of each stack;
    wherein the EHC system is configured such that a coolant distribution through each stack is determined based on a temperature differential of the coolant through each stack.

2. The EHC system of claim 1, wherein the controller is configured to control the power supply of each EHC stack including matching the power of each stack, while maintaining a total current flow to the system based on a desired hydrogen throughput.

3. The EHC system of claim 2, wherein the controller is configured to control the power supply of each EHC stack by substantially matching the heat generation by each stack.

4. The EHC system of claim 1, wherein the controller is configured to control the power supply of each EHC stack by substantially matching the electrical potential applied to each EHC stack while optimizing the current distribution applied to each EHC stack.

5. The EHC system of claim 4, wherein a best performing EHC stack is configured to be the highest temperature stack and a worst performing EHC stack is configured to be the lowest temperature stack.

6. The EHC system of claim 1, wherein the controller is further configured to increase stack durability by controlling the power such that the heat load of each stack is substantially equal.

7. The EHC system of claim 1, wherein the sensors are configured to generate a signal indicative of the temperature difference across each EHC stack;
    wherein the controller is configured such that the temperature difference of each stack is utilized in determining a power distribution of the power supplies.

8. A method of controlling a multi-stack electrochemical hydrogen compressor (EHC) system having two or more EHC stacks, comprising:
    directing a gas stream containing hydrogen to the two or more EHC stacks;
    supplying power to the two or more EHC stacks from independent power supplies; and
    controlling the power independently supplied to each EHC stack;
    circulating water through each EHC stack;
    circulating coolant through each EHC stack;
    detecting the temperature of the coolant exiting each stack;
    detecting the temperature of the coolant entering each stack;
    calculating a temperature differential of the coolant through each stack;
    determining a coolant flow distribution through each stack based on the temperature differential of the coolant through each stack.

9. The method of claim 8, wherein controlling the power reduces total energy consumption of the EHC system.

10. The method of claim 9, wherein controlling the power includes matching the power of each EHC stack, while maintaining a total current to the system sufficient to meet a desired throughput of hydrogen.

11. The method of claim 10, wherein controlling the power further comprises substantially matching heat load from each EHC stack.

12. The method of claim 8, wherein controlling the power includes reducing a total power consumed by the system by substantially matching the electrical potential applied to each EHC stack while optimizing the current distribution applied to each EHC stack.

13. The method of claim 8, wherein controlling the power includes supplying the most current to a best performing EHC stack of the system such that it is the highest temperature stack while supplying the least current to a worst performing EHC stack of the system such that it is the lowest temperature stack.

14. The method of claim 8, wherein controlling the power includes substantially balancing the heat load of all the stacks in order increase stack durability.

15. The method of claim 8, further comprising:
 detecting a temperature difference across each EHC stack;
 wherein controlling the power independently includes utilizing the temperature difference of each stack in determining a power distribution of the from the independent power supplies.

\* \* \* \* \*

UNITED STATES PATENT AND TRADEMARK OFFICE
CERTIFICATE OF CORRECTION

PATENT NO. : 10,000,855 B2  
APPLICATION NO. : 14/790045  
DATED : June 19, 2018  
INVENTOR(S) : Kevin Beverage et al.

Page 1 of 1

It is certified that error appears in the above-identified patent and that said Letters Patent is hereby corrected as shown below:

In the Claims

Claim 15, Column 11, Lines 19-20, "determining a power distribution of the from the independent power supplies" should read --determining a power distribution from the independent power supplies--.

Signed and Sealed this  
Twenty-eighth Day of August, 2018

Andrei Iancu  
*Director of the United States Patent and Trademark Office*